United States Patent [19]

Monaghan

[11] Patent Number: 4,486,211

[45] Date of Patent: Dec. 4, 1984

[54] APPARATUS AND METHODS OF OPERATION FOR CONVERTING FLY ASH INTO HIGH QUALITY MINERAL WOOL

[75] Inventor: George J. Monaghan, Wayne, Pa.

[73] Assignee: Energy Fibers Int'l Corp., Niagara Falls, N.Y.

[21] Appl. No.: 457,907

[22] Filed: Jan. 14, 1983

Related U.S. Application Data

[60] Division of Ser. No. 313,486, Oct. 21, 1981, , which is a continuation-in-part of Ser. No. 303,172, Sep. 17, 1981, Pat. No. 4,399,544, which is a continuation of Ser. No. 163,489, Jun. 27, 1980.

[51] Int. Cl.³ .............................................. C03B 37/05
[52] U.S. Cl. .............................................. 65/1; 65/2; 65/4.4; 65/9; 65/10; 373/40
[58] Field of Search ......................... 65/1, 2, 4.4, 9, 10; 373/35, 40

[56] References Cited

U S. PATENT DOCUMENTS

| | | |
|---|---|---|
| 1,996,082 | 4/1935 | Powell . |
| 2,317,895 | 4/1943 | Drill ...................................... 65/9 X |
| 2,319,666 | 5/1943 | Drill . |
| 2,328,714 | 9/1943 | Drill et al. ............................... 65/6 |
| 2,369,605 | 2/1945 | Powell . |
| 2,961,698 | 11/1960 | Rea . |
| 3,077,093 | 2/1963 | Helbing et al. . |
| 3,429,972 | 2/1969 | le Clerc de Bussy . |
| 3,773,485 | 11/1971 | Corsentino ................................ 65/9 |
| 3,883,334 | 5/1975 | Cassidy et al. ............................ 65/2 |
| 4,087,267 | 5/1978 | Goutte et al. ............................. 65/5 |
| 4,120,676 | 10/1978 | Hahn et al. ............................ 65/9 X |
| 4,230,471 | 10/1980 | Levecque et al. ......................... 65/2 |
| 4,268,294 | 5/1981 | Laughlin et al. ........................ 65/10 |
| 4,399,544 | 8/1983 | Monaghan ............................. 373/35 |

FOREIGN PATENT DOCUMENTS

| | | |
|---|---|---|
| 1154387 | 9/1963 | Fed. Rep. of Germany ............ 65/9 |
| 2033074 | 1/1971 | Fed. Rep. of Germany . |
| 1309678 | 1/1962 | France . |
| 958312 | 5/1964 | United Kingdom . |
| 960032 | 6/1964 | United Kingdom . |
| 1239710 | 7/1971 | United Kingdom . |

*Primary Examiner*—Robert Lindsay
*Attorney, Agent, or Firm*—Finnegan, Henderson, Farabow, Garrett & Dunner

[57] ABSTRACT

A system for converting fly ash into mineral wool including an airtight chamber enclosing a molten stream from a spinner and providing an adjustable access to a bin for receiving shot and including an airflow device for drawing air from the bin, through the adjustable access, past the spinner, and into an accumulator, with the adjustable access being operable to selectively limit the rate of flow of the air to thereby control the average weight of fibrous strands entering the accumulator is also disclosed. The quality of accumulated strands is also controlled through a system including a spinner for converting a molten stream into an output of fibrous strands and shot, a cyclone, and a collector with conduit means delivering fibrous strands from the spinner to cyclone and from a light fiber vortex exit or the cyclone to the collector. Preferably, the cyclone includes a variably positionable vortex exit tube. Methods are taught using the above-identified apparatus to generate a high quality mineral wool.

16 Claims, 19 Drawing Figures

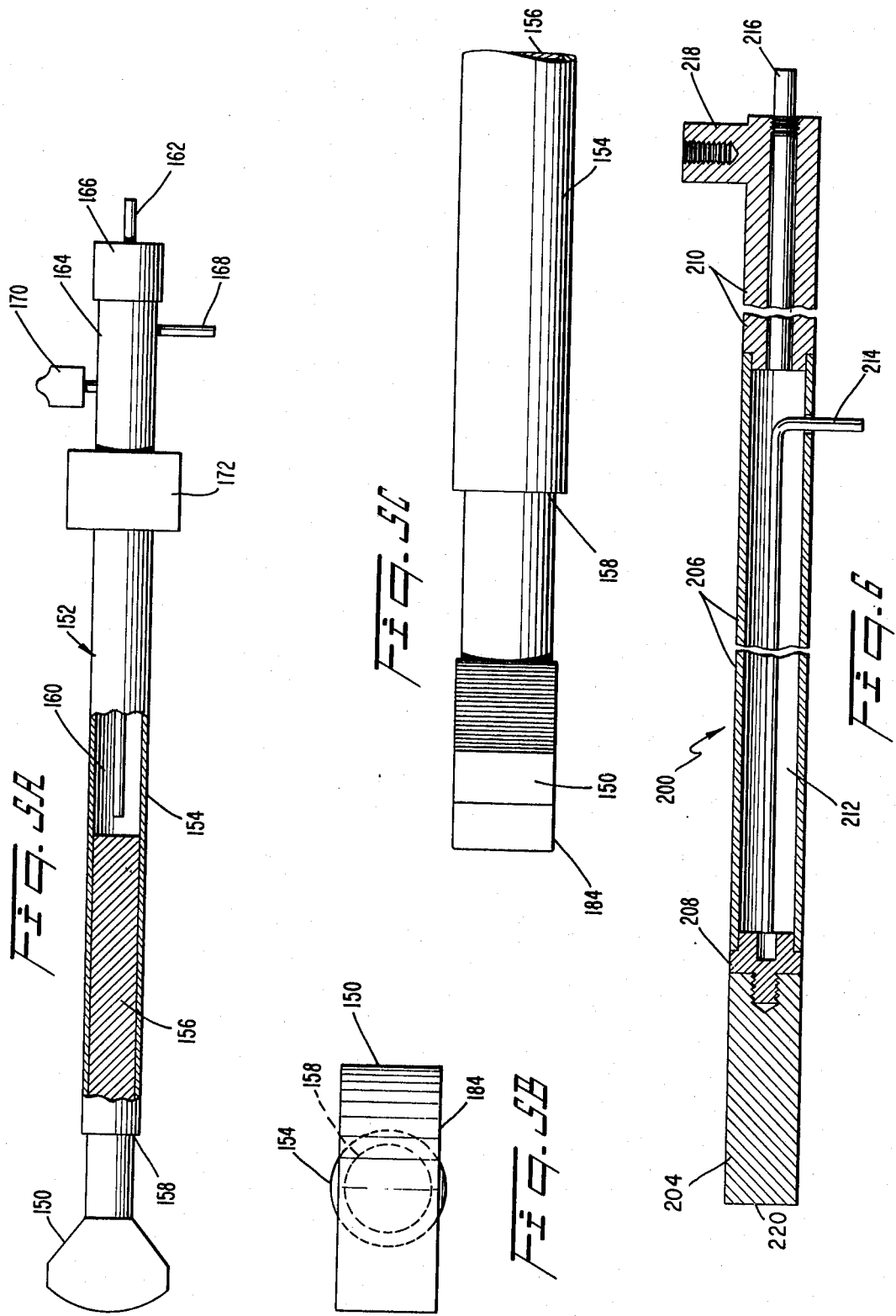

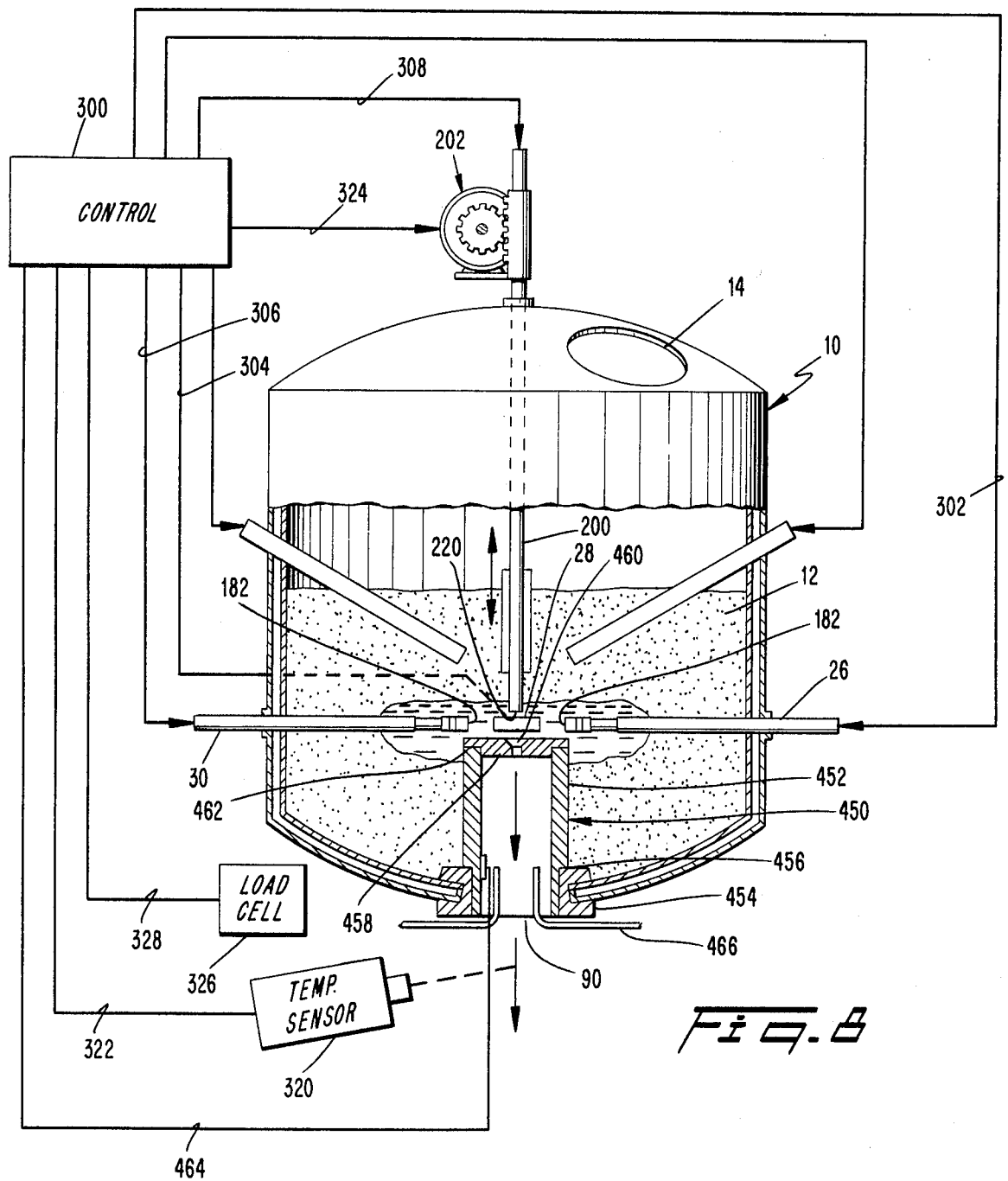

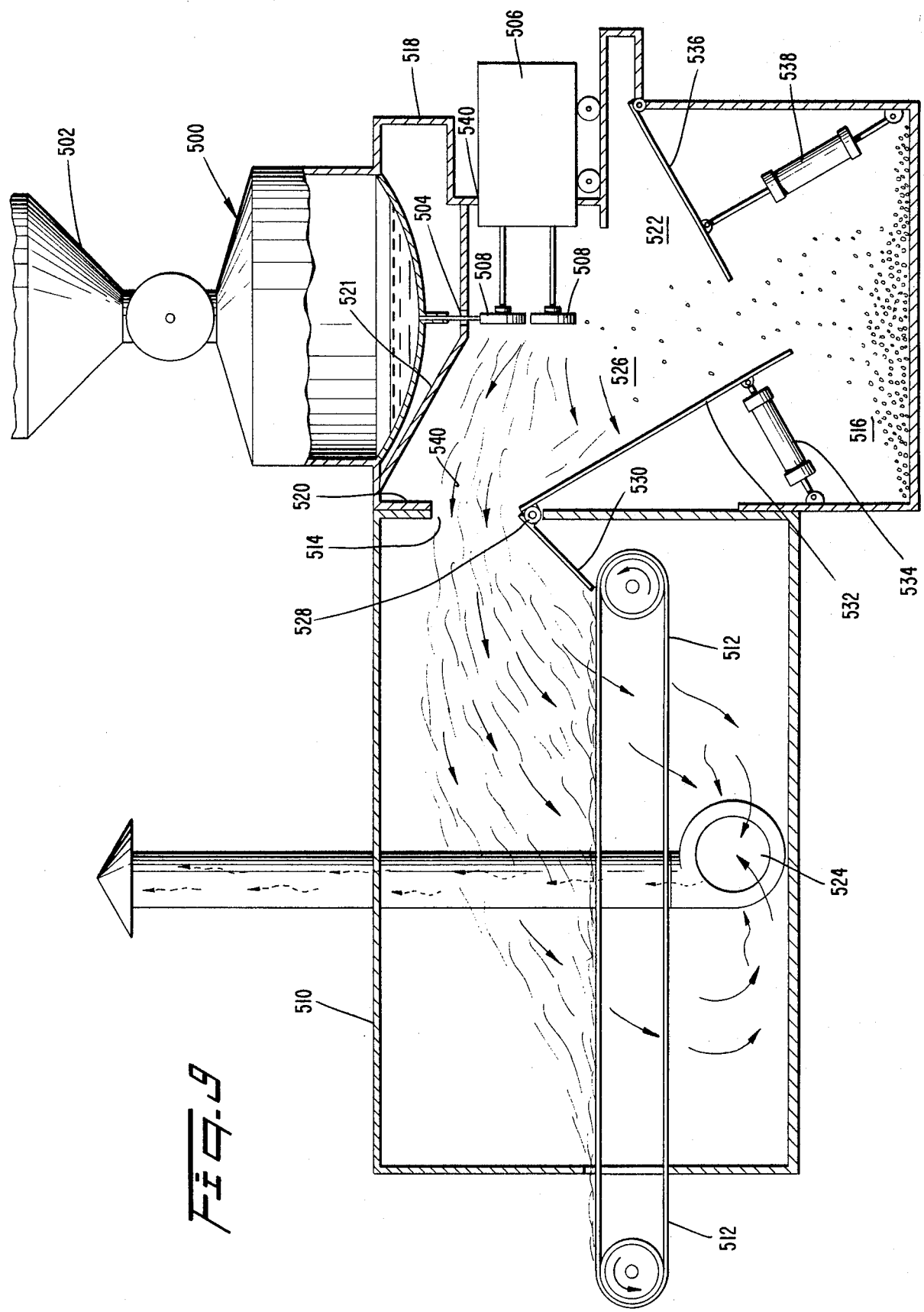

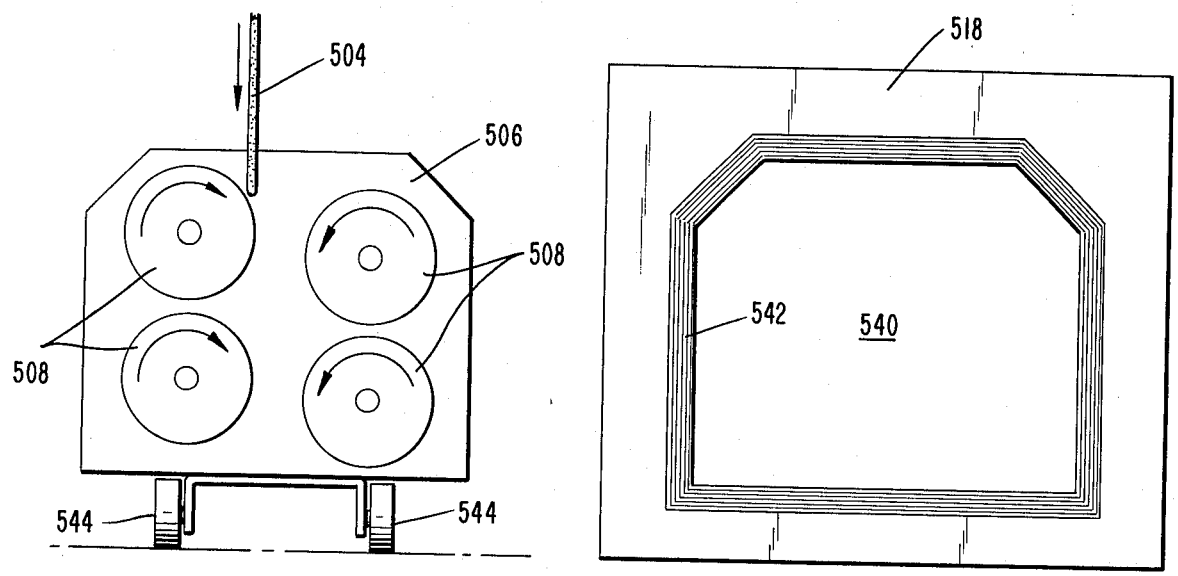
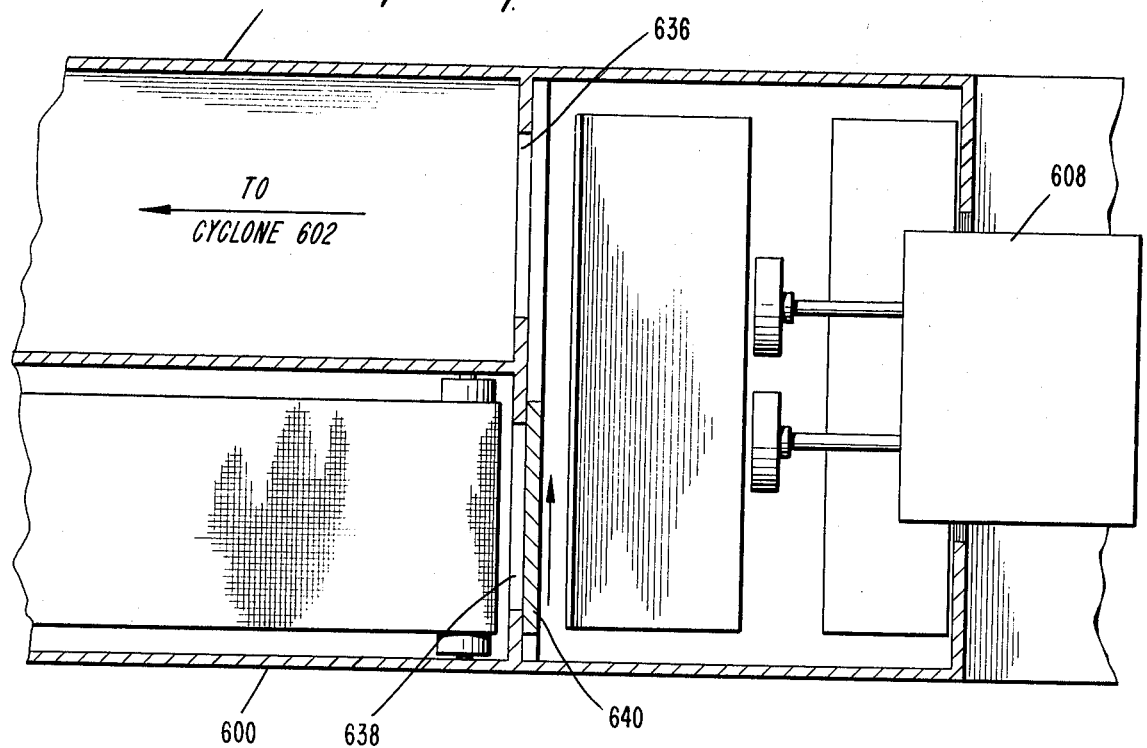

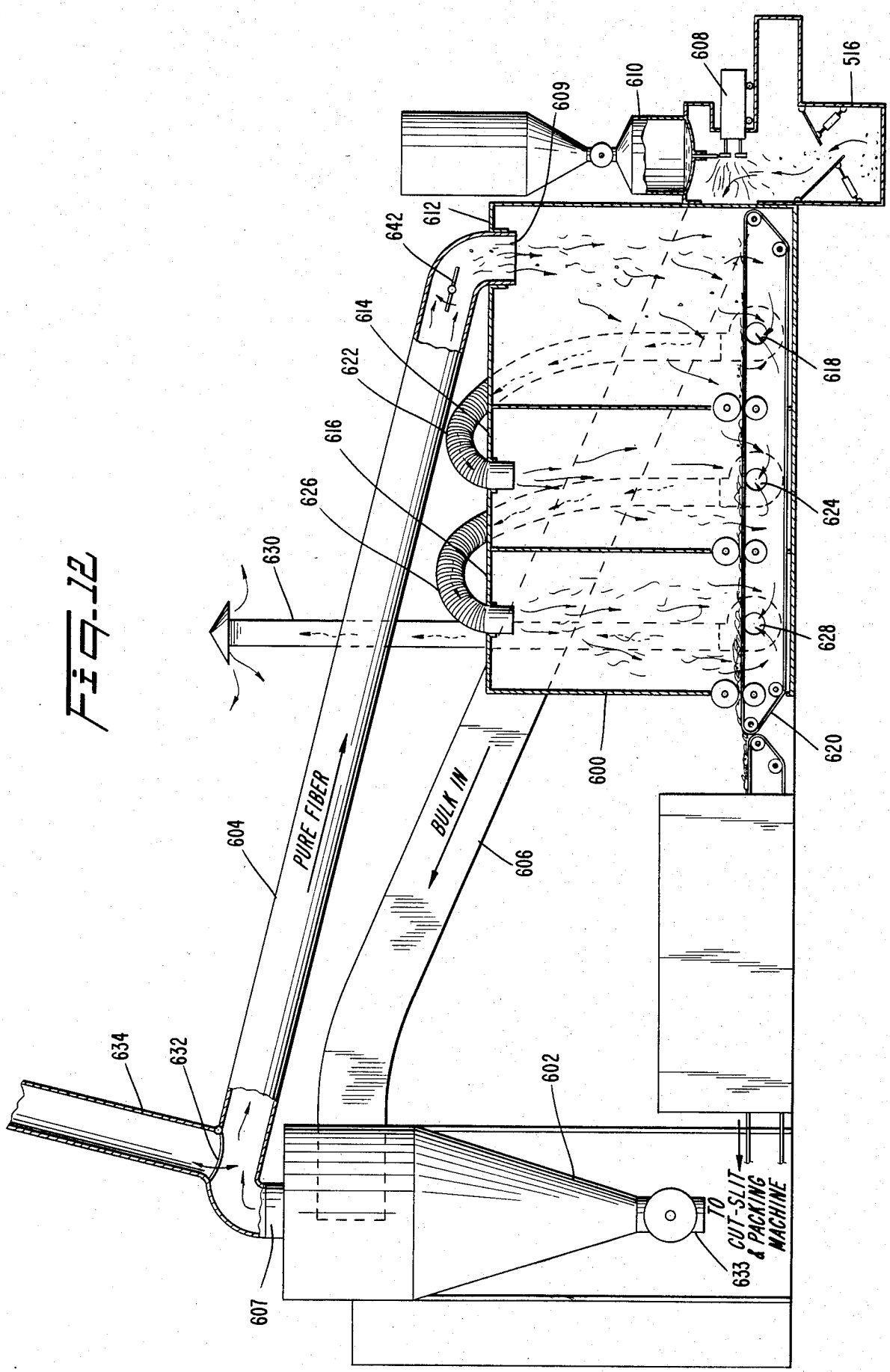

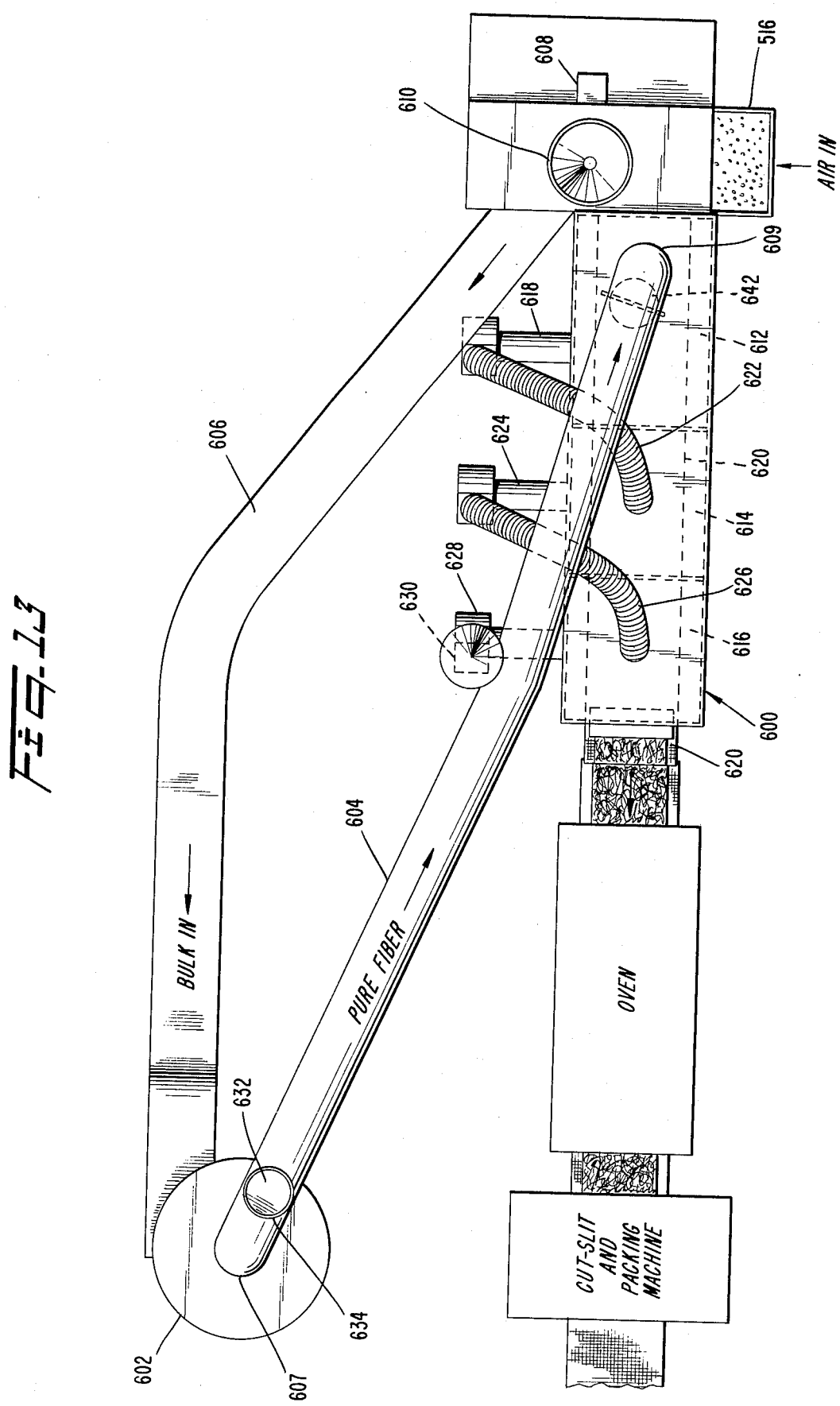

APPARATUS AND METHODS OF OPERATION FOR CONVERTING FLY ASH INTO HIGH QUALITY MINERAL WOOL

This is a division of application Ser. No. 06/313,486, filed Oct. 21, 1981 which is a continuation-in-part application of Ser. No. 06/303,172 filed Sept. 17, 1981 (now U.S. Pat. No. 4,399,544) which in turn is a continuation of Ser. No. 06/163,489 filed June 27, 1980.

BACKGROUND OF THE INVENTION

I. Field of the Invention

The present invention relates to continuous pour, high temperature electronic furnaces suitable for converting large volumes of fly ash into high quality mineral wool, apparatus used in connection with such furnaces, the resultant mineral wool products, and methods for manufacturing those products.

II. Description of the Prior Art

The production of electrical power from coal using standard combustion methods leaves coal fly ash as a by-product. This fly ash is a health and environmental hazard, and presently is an economic liability to an electrical power producer.

Mineral wool is a fine fibrous "wool-like" material, typically made by deflecting a small stream of molten rock or similar material, such as fly ash, with a jet or stream of fluid, or with a rotating wheel of a spinner. The action of the jet of fluid, or spinner, deflects the mineral wool into fibrous strains which harden before the strains reach the floor. Balls of hardened material which do not deflect into fibrous strands called "shot" are also formed, either attached or unattached to the strains. Accumulated, the fibrous strands form mineral wool which has great utility as temperature and sound insulation.

A manufacturing process of converting fly ash into mineral wool ideally requires that the fly ash be continuously melted and poured within critical temperature and pour rate tolerances. For example, fly ash typically melts and pours at around 2765 degrees Fahrenheit. However, at this temperature the fly ash is a gummy mass, whereas at 2875 degrees Fahrenheit the fly ash flows like water. Moreover, the diameter of the resultant fibrous strains is highly dependent upon the temperature of the molten fly ash. Accordingly, it is essential that any furnace used to melt fly ash for the production of mineral wool have the capacity to control the temperature of fly ash to precise tolerances, on the order of five to ten degrees centrigrade, while processing large continuous volumes of fly ash—on the order of 40,000 lbs/hr for weeks at a time. However, no know prior art furnace has this degree of control over the temperature of high volume molten fly ash.

One example of a prior art attempt to utilize an electronic furnace to melt fly ash and produce mineral wool is illustrated in U.S. Pat. No. 2,817,695 issued to Hartwig. Hartwig employs three main electrodes placed 120 degrees from one another in a plane. A nozzle assembly is movably positioned along a line perpendicular to the plane of the main electrodes at the center point of the three electrodes. The nozzle assembly is cooled below oxidation temperature by coolant flowing in the nozzle assembly.

Hartwig recognizes the need to provide accurate temperature control and attempts to accomplish this control by cooling the nozzle assembly and by supplying heat to the nozzle in accordance with a temperature measurement of melted product passing through the nozzle assembly. Hartwig suggests that one way of achieving the requisite control is to apply an electrical potential between the nozzle and a selected one of the main electrodes to effect resistive heating of the melted product at the nozzle. However, except for stating that auxillary power to the nozzle is turned on after the nozzle assembly has been properly positioned, Hartwig provides no teaching of how the suggesteed resistive heating of the product adjacent the nozzle is to be accomplished. Instead, Hartwig concentrates on the structure of coolant passages in the nozzle assembly.

U.S. Pat. No. 3,147,328 issued to Le Clerc de Bussy discloses an electric glass making furnace which provides: three primary electrodes angularly spaced 120 degrees apart in the same plane; a first conductive disc positioned along a line perpendicular to the plane of the main electrodes and which passes through the center of the three primary electrodes, and with the first disc having a passageway through which melted glass may pour out of the vessel; a plurality of auxillary starting electrodes located above the plane of the three primary electrodes and movably positioned adjacent the opening of the passage in the first disc; and a second disc movably positioned along the above-mentioned line of the first disc to form a slot between the first and second discs, which slot is substantially on the same plane as the median plane of the primary electrodes.

In operation of the Le Clerc de Bussy device, with the second disc in a separated position, the starting electrodes are moved together three centimeters from each other adjacent the opening of the passageway in the first disc, and are electrically energized to melt glass adjacent the first disc. The glass between the starting electrodes is also heated with a blow pipe. The starting electrodes are withdrawn as the glass begins to melt and the primary electrodes are energized. When the glass adjacent the first disc is in a liquid state, the second disc is brought into position above the first disc and is also supplied with electrical energy.

According to Le Clerc de Bussy, in the course of normal operation a major part of the current in the primary electrodes travels from a primary electrode through the glass, from the glass to the two discs, and finally through the glass to another primary electrode. The electrical circuit diagram supplied with Le Clerc de Bussy shows the primary electrodes to be energized by a three-phase current source, and shows the first and second discs to be energized by single-phase current drawn from a three-phase power supply.

Le Clerc de Bussy recognizes that the hottest region in the molten glass is created between the two discs and the primary electrodes. However, the electrical and mechanical configuration of Le Clerc de Bussy does not appear to provide control of temperature adjacent the passageway which would be sufficient to provide for high volume melting of fly ash as is required in a high volume mineral wool manufacturing process. Instead, according to Le Clerc de Bussy, only a small stream of glass is pulled through the slit between the two discs and sucked through the passageway of the first, lower, disc.

Other examples of electronic furnaces are provided by U.S. Pat. Nos. 3,876,817 and 3,659,029 issued to Le Clerc de Bussy and by U.S. Pat. No. 3,983,309 issued to Faulkner et al. However, none of these additional patents appears to teach a furnace arrangement of method of operation which provides for the required amount of temperature control for large scale melting of fly ash.

It is, therefore, a primary object of the present invention to provide apparatus and methods of operation which can effectively convert large quantities of fly ash into high quality mineral wool.

In this regard, another object of the present invention is to provide apparatus and methods of operation which permit large scale conversion of fly ash into mineral wool through the use of multiphase electric current.

A further object of this first aspect of the present invention is to provide an electronic furnace and method which is capable of electronically generating a large amount of heat at a precisely controlled temperature over an exit orifice in a melting vessel in order to permit large amounts of fly ash immediately over that orifice to be raised to a precise temperature and to permit controlled flow of that fly ash through the orifice to produce large quantities of high quality mineral wool.

In the process of providing continuous large volume melting of fly ash, attention must be focused on the nozzle assembly and nozzle support assembly. Prior art nozzle assemblies are often very expensive to manufacture and difficult to replace. For example, in Hartwig the nozzle assembly comprises a cylindrical portion which ends in an inverted conically-shaped part, at the apex of which a product exit orifice is formed. Manufacture of such an assembly is accomplished by the complicated and expensive procedure of forming drawn tungsten or molybdenum. Moreover, water coolant tubes are provided adjacent the assembly to cool the tungsten or molybdenum. Corrosion of these coolant tubes during furnace operation may result in a disastrous steam explosion.

The U.S. Pat. No. 3,147,328 Le Clerc de Bussy nozzle assembly comprises a lower disc coupled to the upper end of a molybdenum rod which is provided with an axial passageway. A heat exchanger in the form of a plurality of fins or other radial projections is coupled to the rod, and a platinum member is attached to the lower end of the rod to define an exit passageway from the nozzle assembly. Again, the Le Clerc de Bussy nozzle assembly is obviously difficult and expensive to manufacture.

Although simpler nozzle assemblies are known, such as that disclosed in U.S. Pat. No. 2,276,295 issued to Ferguson, none appear to provide the ease of construction and lack of expense sought, and still establish an effective product exit orifice for a continuous pour, high volume furnace.

Accordingly, it is an object of another aspect of the present invention to provide a continuous pour furnace nozzle assembly which is inexpensive to manufacture and easy to replace.

In the manufacture of mineral wool from fly ash, it is necessary to provide not only a furnace having the capacity to control the temperature of the molten fly ash to precise tolerances and a nozzle assembly through which molten fly ash may pass, but also some form of apparatus to accumulate the resultant fibrous strands into mineral wool. However, as mentioned above, the fibrous strands are not produced alone. Instead, shot and other heavy undesirable non-fibrous material are intermixed with and often attached to the more desirable fibrous strands. In addition, the diameter of the strands, and hence their effective insulative capacity, often extend over a large range, and the accumulator apparatus desirably has the capacity to selectively choose a desired range of diameters.

Efforts have been made in the past to separate the shot and other heavy undesirable non-fibrous material from more desirable lighter fibrous strands. One such prior art method involves granulating bulk material containing shot and the like, and passing the material over a rotating screen through which a large portion of the shot and other non-fibrous portions are sifted out. In this operation, the lighter fibrous strains are rolled into small balls, pads, or pellets which are known in the industry as granulated wool. The fibrous balls, pads, or pellets, however, are not suitable for accumulating into high quality mineral wool by a "dry" process because these balls, pads, or pellets do not readily felt to each other so that the product of such a process has little or no tensile strength. When it is desired to use such granulated wool to make felted material, the granulated wool is first mixed and bonded together in water with wet paper pulp. The wet mixture is then compacted, dried, and cut.

Another prior art method illustrated in U.S. Pat. No. 2,319,666 issued to Drill, employs a shot-receiving hopper located directly under a stream of molten material. A blast assembly is located above the hopper to intersect the molten stream with a blast stream, such as a stream of steam, to convert the molten stream into mineral wool fibers and non-fibrous portions such as slugs and shot. A chamber is provided by Drill which encloses the blast assembly and hopper, and which also encloses a porous conveyer belt. A blower reportedly withdraws steam and air from the chamber through the belt and returns a selected portion thereof to the chamber through the hopper. This upward moving return steam and air from the hopper acts to prevent lighter mineral wool fibers from accumulating in the hopper along with heavier shot and undesirable material.

Accordingly, Drill represents an important development in the art of producing mineral wool. However, it is another object of the present invention to improve upon the mineral wool manufacturing apparatus and methods disclosed by Drill.

More specifically, an object of the present invention is to provide mineral wool manufacturing apparatus and methods which more effectively separate shot and the like from lighter fibrous strands.

In this regard, another object of the present invention is to provide mineral wool manufacturing apparatus and methods which selectively control the degree of separation of shot and the like from more desirous lighter fibrous strands.

Through the use of the furnace of the present invention, preferably with the nozzle assembly of the present invention, in combination with the fiber accumulation and shot separation apparatus and methods of the present invention, mineral wool having commercially suitable tensile strength and having a high percentage of highly desirable diameter fibrous strands can be produced. Since no known prior art apparatus or method has the temperature control, accumulation, and separation control of the apparatus and methods taught herein, the resultant mineral wool in and of itself is new and unique.

More specifically, it is well known in the prior art that mineral wool forms a most effective temperature insulator when consisting primarily of fibrous strands having an average diameter small enough to maximize the volume of air trapped between the fibers, and yet large enough to prevent presentation of a health hazard. Preferably, the strands have an average diameter of less than 15 microns yet greater than 3 microns. Strands having a diameter less than about 3 microns are considered a safety hazard due to their capacity to break loose into the open atmosphere and be ingested by humans, subjecting those humans to possible respiratory problems, and strands having a diameter greater than 15 microns result in a reduction in air space between strands to the point that the insulative effect of the resultant mineral wool is materially lower.

It is, accordingly, yet another object of the present invention to provide a mineral wool product in which a high percentage by weight of the mineral wool, 70 to 80 percent, consists of fibrous strands having diameters within a range of about 3 microns to 15 microns.

Additional objects and advantages of the invention will be set forth in part in the description which follows, and in part will be obvious from the description or may be learned by practice of the invention. The objects and advantages of the invention may be realized and obtained by means of the instrumentalities and combinations particularly pointed out in the appended claims.

SUMMARY OF THE INVENTION

The present invention comprises a system for converting fly ash into mineral wool including: (a) a furnace for melting fly ash to produce a molten stream; (b) spinner means located below the furnace to intersect the molten stream and convert the molten stream into fibrous strands and shot; (c) an accumulator of fibrous strands, including an input opening located adjacent the spinner means; (d) a bin located below the spinner means to receiver the shot and open to atmospheric pressure air; (e) an air tight chamber for enclosing therein the molten stream and the spinner, the chamber including an air tight seal to the input opening of the accumulator and adjustable access for the shot to the bin, which access also provides the only source of air to the chamber; and (f) an air flow device for drawing atmospheric pressure air from the bin, through the adjustable access, past the spinner and into the accumulator, and for carrying fibrous strands into the accumulator, the adjustable access being operable to selectively limit the rate of flow of air, to thereby control the average weight of the fibrous strands entering the accumulator.

Preferably, the accumulator includes a collector for forming fibrous strands into a blanket of mineral wool, which collector includes a continuous, porous belt located adjacent the input opening of the accumulator; the adjustable access to the bin including an inverted V-shaped plate hinged at the apex of the V and located with one leg of the V-shaped plate guiding the fibrous strands to the belt and the other leg of the plate guiding the shot to the bin.

In still another aspect of the present invention, there is provided a system for converting fly ash to mineral wool comprising: (a) a furnace for melting fly ash to produce a molten stream; (b) a spinner for converting the molten stream into an output of fibrous strands and shot; (c) a cyclone capable of separating heavy fibrous strands and shot from lighter fibrous strands; (d) a collector for forming fibrous strands into a blanket of mineral wool; and (e) a conduit for delivering fibrous strands from the spinner to the cyclone and for delivering the lighter fibrous material from the cyclone to the collector.

Preferably, the cyclone includes a conically-shaped chamber having a vertically aligned longitudinal axis and a diameter decreasing from top to bottom, means for introducing input from the spinner at the top at the chamber, means for removing heavy fibrous strands and shot from the bottom of the chamber, and vortex tube means for removing lighter fibrous strands from the top of the chamber, the vortex tube means including a first tubular member having a longitudinal axis coincident with the axis of the chamber with end of the first tubular member extending into the interior of the chamber, and means for adjusting the distance that the first tubular member extends into the chamber to thereby control the average weight of the lighter fibrous strands removed from the chamber through the vortex tube means.

BRIEF DESCRIPTION OF THE DRAWINGS

The accompanying drawings which are incorporated in and constitute a part of the specification, illustrate a preferred embodiment of the invention and, together with the general description given above and a detailed description of the preferred embodiment given below, serve to explain the principles of the invention.

FIGS. 5A, 5B, and 5C provide a top view, end view, and side view of a primary electrode in accordance with the teachings of the present invention;

FIG. 6 provides a side view of a control electrode in accordance with the teachings of the present invention;

FIG. 7 provides an electrical diagram of a control circuit incorporating the teachings of the present invention;

FIG. 8 is a cross-sectional view of another nozzle and nozzle support incorporating the teachings of the present invention;

FIG. 9 is a cross-sectional view of a system for converting fly ash into mineral wool in accordance with the teachings of the present invention;

FIG. 10 is an end-view of a spinner using the system illustrated in FIG. 9;

FIG. 11 illustrates an opening in the accumulator of FIG. 9;

FIG. 12 is a side view of another system for converting fly ash into mineral wool in accordance with the teachings of the present invention;

FIG. 13 is a top view of the system illustrated in FIG. 12;

FIG. 14 is a top view of the openings to the cyclone and collector illustrated in FIGS. 12 and 13;

DESCRIPTION OF THE PREFERRED EMBODIMENT

Reference will now be made to the present preferred embodiment of the invention as illustrated in the accompanying drawings.

Figure 1:
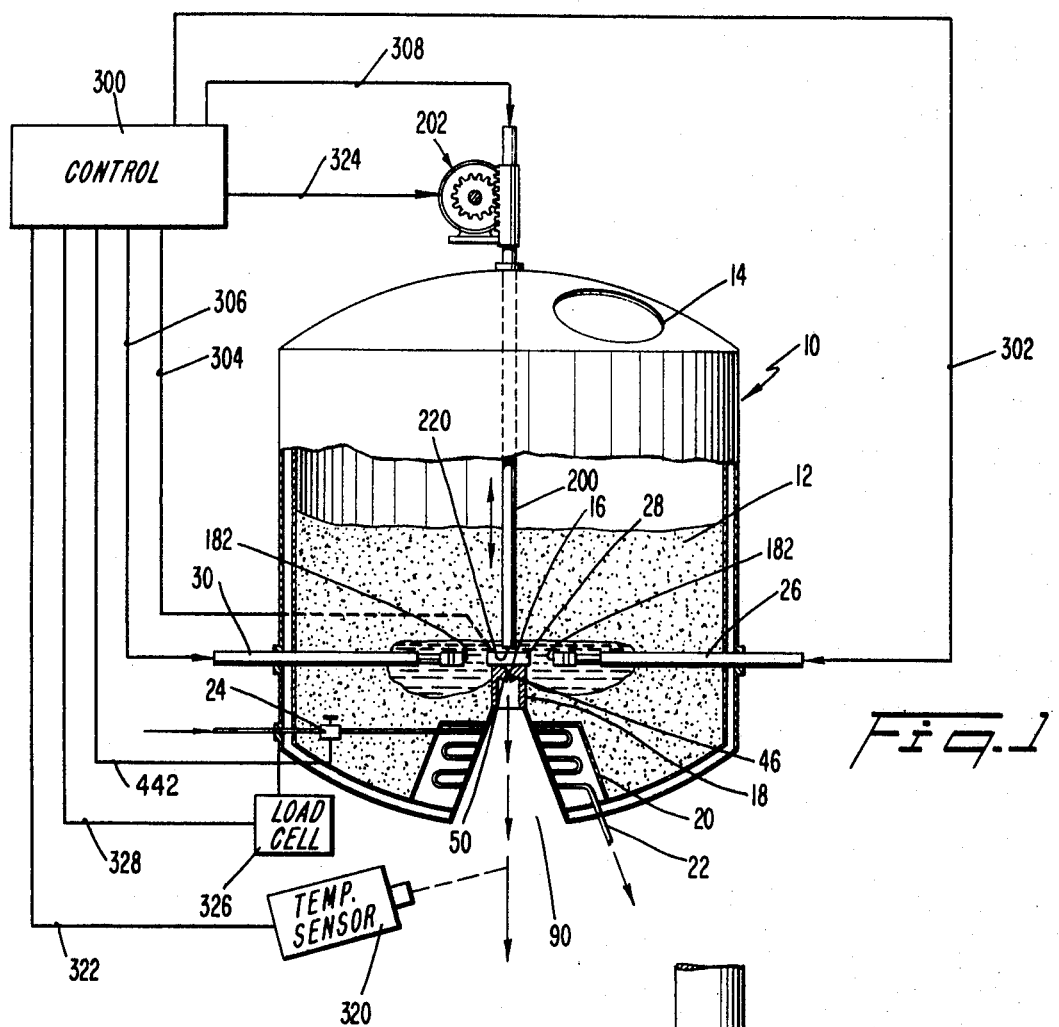
FIG. 1 schematically illustrates a melting furnace incorporating the teachings of the present invention.

In FIG. 1 there is schematically shown a vessel 10 for receiving product 12 to melted, such as fly ash. The fly ash is introduced into vessel 10 through an opening 14 at the top of the vessel. A second opening or product exit orifice 16 is located near the bottom of vessel 10 to permit melted product to exit the vessel. More specifically, orifice 16 is formed in and defined by a nozzle 18, which nozzle is in turn mounted on a nozzle support assembly 20. A cooling mechanism 22 is provided within nozzle support assembly 20 and is controlled by a nozzle coolant valve 24. First, second, and third primary electrodes 26, 28, and 30 are shown positioned within vessel 10 to surround orifice 16.

A more detailed description of vessel 10, nozzle 18, nozzle support assembly 20, and primary electrodes 26, 28, and 30 is provided below with respect to FIGS. 2-5.

Figure 2:
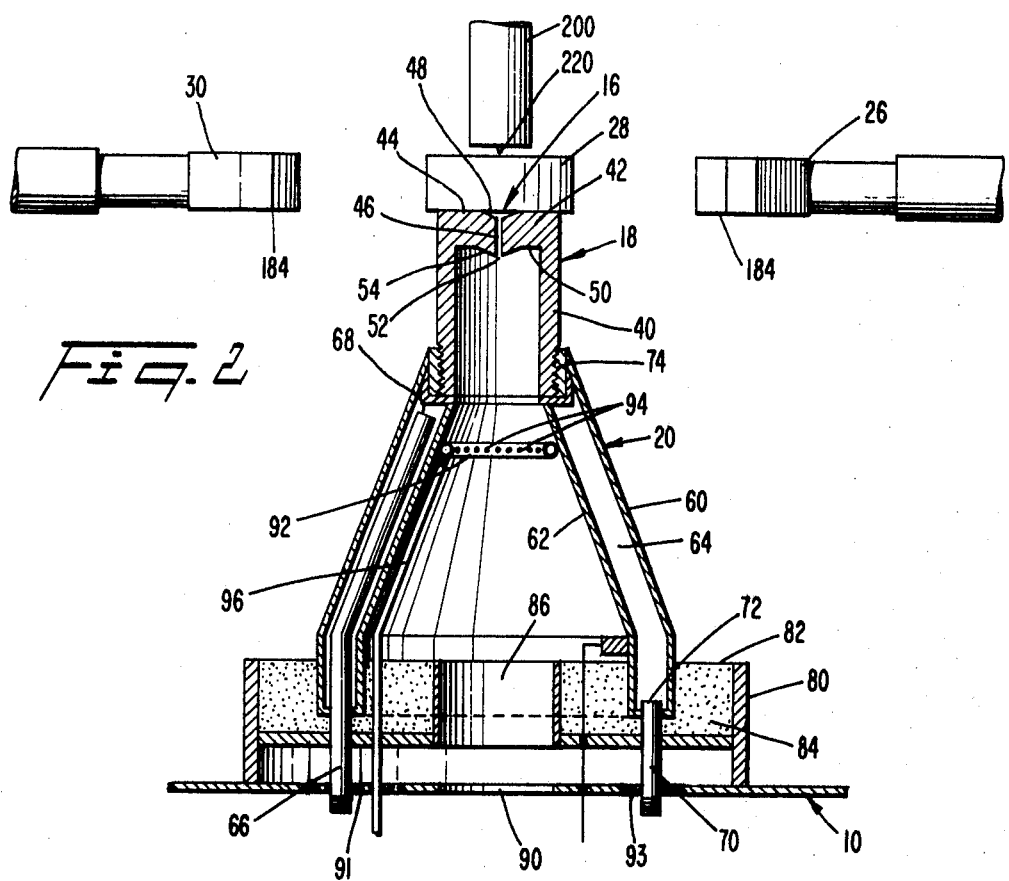
FIG. 2 is a cross-sectional view of a nozzle and nozzle support incorporating the teachings of the present invention.
Figure 1:
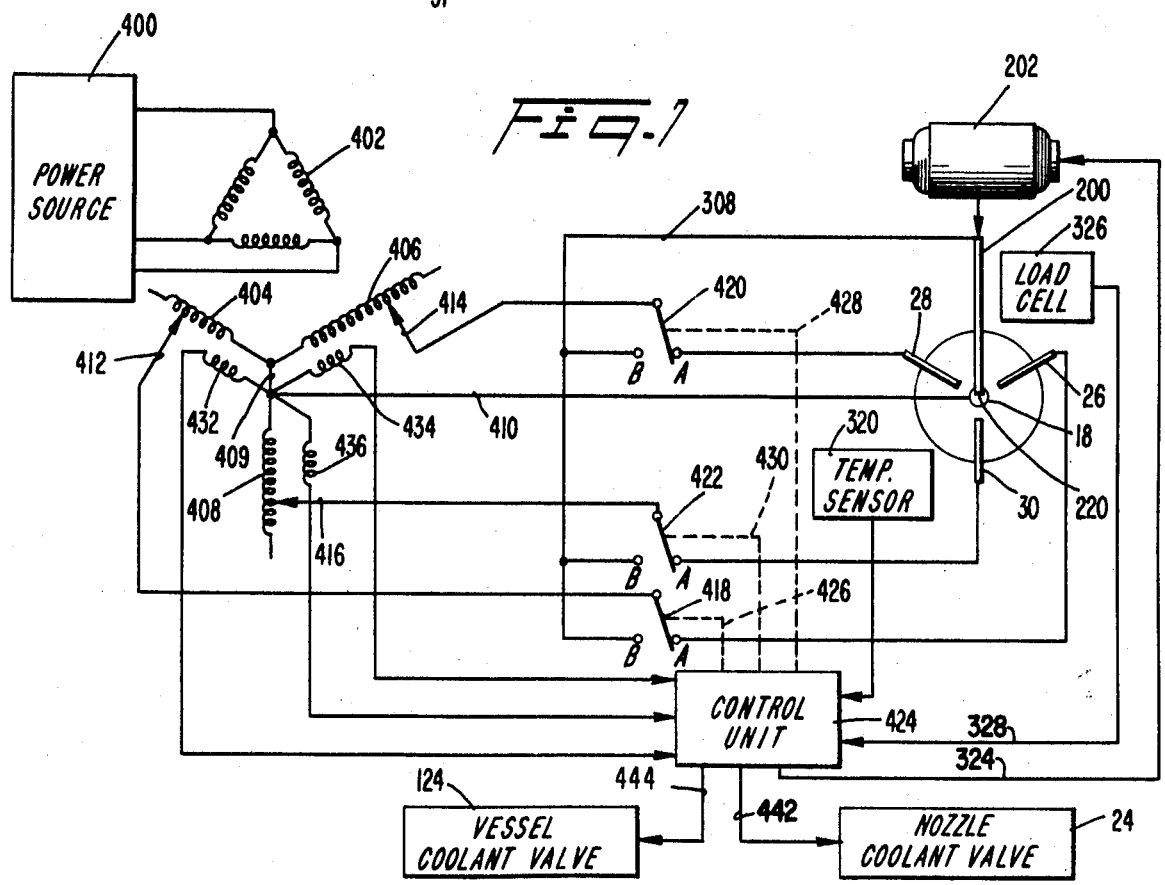

FIG. 2 shows a cross-sectional view of nozzle 18 and nozzle support assembly 20. More specifically, nozzle 18 comprises a hollow cylinder 40, preferably constructed of molybdenum, which is capable of withstanding exposure to melted product on the order of 4700 degrees Fahrenheit. If the temperature of melted product adjacent nozzle 18 is intended to exceed 4700 degrees Fahrenheit, then nozzle 18 may be fabricated of graphite. The top of cylinder 40 is enclosed with a plug 42, also preferably made of molybdenum. Cylinder 40 and plug 42 preferably comprise a single intergral structure. Plug 42 has an upper surface 44 which contains orifice 16. A channel 46 passes through plug 42. Channel 46 has a smaller internal diameter than the diameter of orifice 16, and channel 46 extends through plug 42 to the interior of cylinder 40. A conical indent 48 on upper surface 44 couples orifice 16 to channel 46.

Plug 42 of nozzle 18 further includes a lower surface 50 opposite upper surface 44 which lower surface 50 has an opening 52 to channel 46. Opening 52 is surrounded by a convex protuberance 54 of lower surface 50.

The diameter of channel 46 is preferably on the order of 2 and one-half inches to accommodate a flow rate of 40,000 lb/hr of melted fly ash. The length of channel 46 is preferably six times greater than the diameter of channel 46. The long length of channel 46 and the upper angle created by conical indent 48 cause a stream of melted product to stabilize as the product flows through nozzle 18. The convex protuberance 54 on lower surface 50 prevents the melted material from splashing or wicking to the side of nozzle support assembly 20 upon exit from nozzle 18.

Nozzle support assembly 20 is preferably made of copper, stainless steel, or black iron. Support assembly 20 comprises an outer conical wall 60, and an inner conical wall 62 which form a water tight compartment 64 therebetween. Pipe 66 extends into compartment 64 and terminates at end 68 adjacent nozzle 18. A second pipe 70 also extends into compartment 64, and terminates at end 72 near the lower portion of nozzle support assembly 20. Accordingly, coolant such as water may enter compartment 64 through pipe 66 and exit compartment 64 through pipe 70. Nozzle 18 is mounted in electrical contact and heat conducting contact with nozzle support assembly 20 by means of threads 74 at the upper end of support assembly 20, and is, therefore, cooled in accordance with the temperature of support assembly 20.

Nozzle support assembly 20 is mounted to the base of vessel 10 by support 80. Support 80 includes a circular channel 82 dimensioned to receive the lower end of nozzle support assembly 20. Channel 82 is filled with insulating cement 84 of high alumina to maintain electrical isolation between the electrical combination of nozzle 18 and support assembly 20, and the walls of vessel 10. Base 82 contains a centered circular opening 86. Opening 90 in the base or floor of vessel 10 permits melted product to pass from the interior of nozzle support 20 through opening 86 of base 80 to the exterior of vessel 10. Insulators 91 and 93 are also provided in the base or floor of vessel 10 to electrically isolate pipes 66 and 70 from vessel 10.

To protect nozzle 18 from oxidation, the interior of nozzle support assembly 20 may be flooded with an inert gas such as nitrogen. As illustrated, a ring spray valve 92 is positioned in the interior circumference of support assembly 20. Ring spray valve 92 contains openings 94 for release of nitrogen in the direction of nozzle 18. A supply pipe 96 is provided to deliver nitrogen to spray valve 92.

Figure 4A:
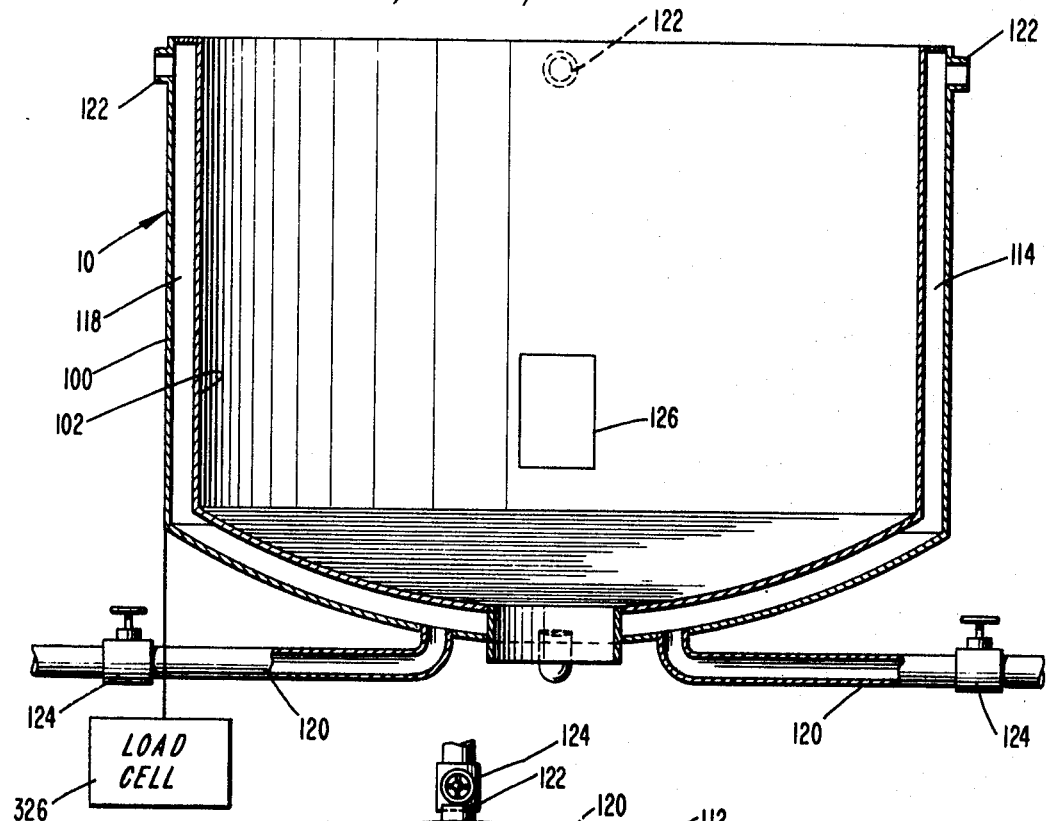
FIGS. 4A and 4B provide a sectioned side view, and a top view of a vessel incorporating the teachings of the present invention.
Figure 4B:
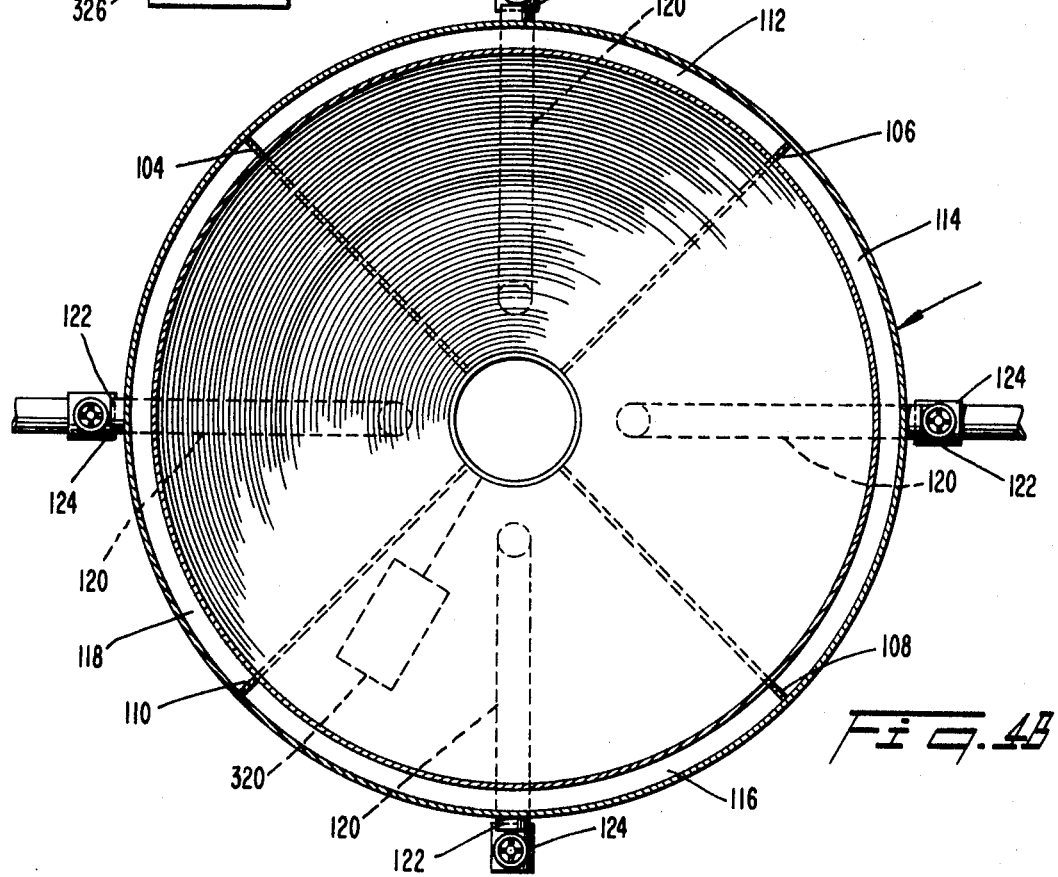

FIGS. 4A and 4B show a preferred configuration of vessel 10, having exterior side walls 100 and interior side walls 102. Baffles 104, 106, 108 and 110 extend vertically up the sides of vessel 10 to divide the opening between side walls 100 and 102 into four separate fluid-tight compartments 112, 114, 116 and 118. Each compartment 112-118 has its own input port 120 and its own exit port 122. Vessel coolant valves 124 control the flow of coolant into input ports 120. Thus, each compartment 112-118 is positioned vertically adjacent another in the side walls of vessel 10, and, through the independent operation of valves 124, each compartment provides an independent means for cooling a particular vertical quadrant of vessel 10.

In FIG. 4A, an opening 126 is shown through the side of vessel 10 which receives one of primary electrodes 26, 28, or 30.

FIGS. 5A-5C illustrate a preferred embodiment of primary electrodes 26, 28, and 30. Each primary electrode preferably includes a fan-shaped tip 150 which is preferably contructed of molybdenum of graphite. Tip 150 is supported by an electrode assembly 152 which includes a heavy walled, hollow pipe 154 constructed of stainless steel, copper, or black iron. Tip 150 has a solid cylindrical portion 156 which slides into first end 158 of pipe 154 and is held rigidly in place by pipe 154. The remaining interior section 160 of the interior of pipe 154 is hollow. A fluid input pipe 162 extends from the extreme end 164 of pipe 154 opposite tip 150 into interior section 160. Fluid input pipe 162 terminates adjacent the beginning of cylindrical portion 156 of tip 150. A pipe cap 166 permits insertion of pipe 162 into the interior of pipe 154 and seals end 164 of pipe 154. Outlet pipe 168 is inserted through the side walls of pipe 154 adjacent cap 166 and provides an exit for coolant introduced into interior section 160 through pipe 162.

A pressure valve 170 also communicates through the walls of pipe 154 to interior section 160 to provide a release escape in the event any steam pockets build up within the interior of the electrode.

An insulation block 172 surrounds pipe 154 to permit electrically insulative mounting of the primary electrodes into vessel 10.

Figure 3:
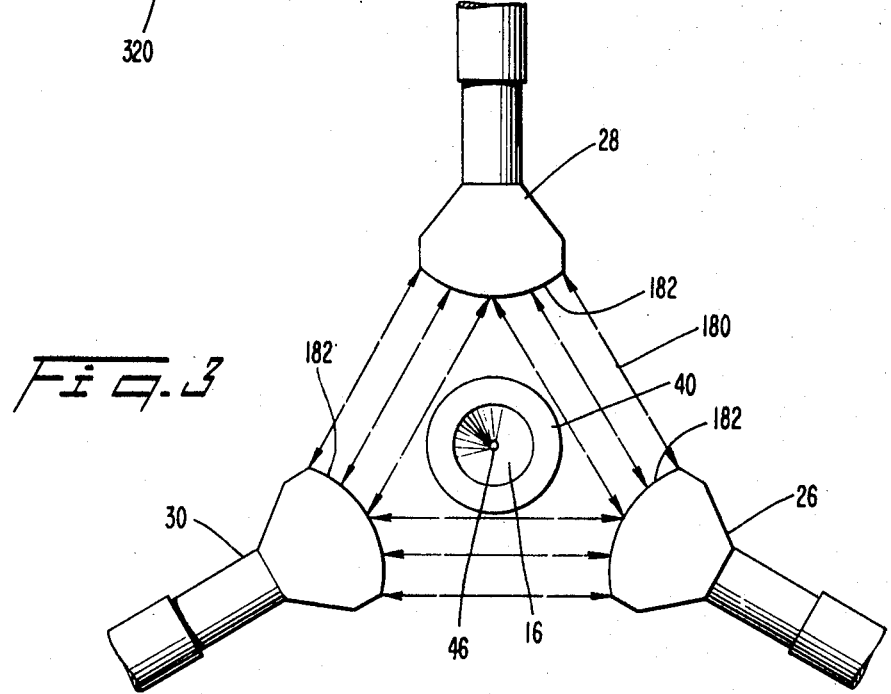
FIG. 3 is a top view of a schematic illustration of the positioning of primary electrodes in accordance with the teachings of the present invention.

As can best be seen from FIGS. 2 and 3, primary electrodes 26, 28, and 30 are positioned to defined primary current paths 180 adjacent that portion of nozzle 18 which defines product exit orifice 16. Preferably, conducting surfaces 182 of tips 150 of electrodes 26, 28, and 30 are convex in shape, and are positioned to tend to equalize the length of primary current paths 180 between adjacent primary electrodes 26, 28, and 30.

As may best be seen from FIG. 2, the bottom surfaces 184 of tips 150 preferably lie generally in the same plane as upper surface 44 of nozzle 18 in which orifice 16 is defined. Thus, primary current paths 180 between electrodes 26, 28, and 30 also lie substantially in the same plane as upper surface 44. This orientation of electrodes 26, 28, and 30 helps to assure that a pool of melted product will lie immediately above orifice 16.

In accordance with the present invention there is provided control electrode means for defining a current path to the means which defines the product exit orifice. For example, as illustratively shown in FIG. 1 a control electrode 200 is provided having an axis positioned collinear with the axis of channel 46 in nozzle 16. Control electrode 200 is mounted to be moveable along its longitudinal axis by means of a motor, hydraulic lift, or similar control mechanism schematically shown by motor 202 in FIG. 1.

A more detailed diagram of a preferred embodiment of control electrode 200 is shown in FIG. 6. As illustrated in FIG. 6, a solid cylindrical electrode tip 204 is provided at one end of control electrode 200. Tip 204 is preferably constructed of molybdenum or graphite, depending upon the temperature of the bath which tip 204 must sustain. A hollow support pipe 206 is provided to hold electrode tip 204 in a desired position. A threaded stud 208 is provided at one end of support pipe 206 for attaching electrode tip 204 to support pipe 206. An electrically conductive pipe cap 210 is provided at the opposite end of support pipe 206 from tip 204. The interior of support pipe 206 between threaded stud 208 and pipe cap 210 forms a hollow fluid-tight passage 212. An input coolant pipe 214 is inserted through a wall of support pipe 206 and terminates in interior passage 212 near threaded stud 208. An exit path is provided from passage 212 through exit pipe 216 which is positioned coincident with the longitudinal axis of pipe cap 210. An electrical connector 218 is also coupled to pipe cap 210 to provide electrical access to control electrode 200.

Further in accordance with the present invention, there is provided circuit means for energizing primary electrode means with multiphase current and for time-sharing the multiphase current with a control electrode means.

As illustratively shown in FIG. 1, for example, there is provided a control circuit 300 which provides over lines 302, 304, and 306 three phase current to primary electrodes 26, 28, and 30, respectively. A line 308 electrically connects control circuit 300 to control electrode 200. As will be explained in more detail in connection with FIG. 7, control circuit 300 operates to time-share the multiphase current supplied over lines 302, 304, and 306 with the control electrode 200 over line 308. More specifically, control circuit 300 operates to sequentially replace each primary electrode 26, 28, and 30 with control electrode 200. When so replaced, the current intended for primary electrodes 26, 28, or 30 instead passes to control electrode 200. This creates an electrically imbalanced load which causes generation of an additional current path from control electrode 200 to nozzle 18. This additional current path increases the temperature of product adjacent the additional current path in the vicinity of orifice 16. The control of current through this additional current path provides a vehicle for precisely regulating the temperature of product adjacent orifice 16. The greater the amount of time control electrode 200 is electrically positioned in place of one of primary electrodes 26, 28, or 30, the greater the amount of current in the additional current path adjacent orifice 16.

Preferably, the amount of time-sharing permitted by control circuit 300 is dependent upon the temperature of product passing through orifice 16. The temperature of product passing through orifice 16 is, in turn, determined by temperature sensor 320, which is positioned below opening 90 in the floor of vessel 10. Temperature sensor 320 may, for example, comprise a device commercially identified by the name Williamson Temperature Control. The output of temperature sensor 320 is coupled by line 322 to an input of control circuit 300.

The amount of time-sharing permitted by control circuit 300 may also be varied depending upon the rate of flow of product through orifice 16. To determine the rate of flow of product through orifice 16, one or more load cells 326 continuously measure the weight of vessel 10 and transmit a signal indicating that weight over line 328 to control circuit 300. The signal over line 328 is, therefore, indicative of the rate of flow of product through orifice 16.

The physical distance between conductive surface 220 at the end of control electrode 200 and orifice 16 also affects current flow adjacent orifice 16. The closer conductive surface 220 is to orifice 16, the greater the temperature of product adjacent orifice 16 for a given amount of current. The distance between conductive surface 220 and orifice 16 is controlled by an output signal from control circuit 300 delivered over line 324 to motor 202.

Accordingly, control circuit 300 may govern the position of conductive surface 220 of control electrode 200 as a function of temperature of product passing through orifice 16 as determined by temperature sensor 320 and/or as a function of the rate of flow of product through orifice 16 as determined of load cells 326.

A schematic of an illustrative example of control circuit 300 is provided in FIG. 7. As shown in FIG. 7, a multiphase power source 400 is coupled to a delta configuration multiphase transformer 402. Secondaries 404, 406, and 408 of transformer 402 are connected in a wye configuration. The common point 409 of the wye configuration of secondaries 404, 406, and 408 is connected by line 410 to nozzle 18 to provide a return current path for current passing through control electrode 200. Variable position taps 412, 414, and 416 are coupled through switches 418, 420, and 422, respectively, to primary electrodes 26, 28, and 30. With switches 418, 420, and 422 in position A, secondaries 404, 406 and 408 are coupled respectively to primary electrodes 26, 28, and 30. Although switches 418, 420, and 422 are illustratively shown to be double-throw, single-pole switches, they may in fact comprise portions of a high power SCR switching circuit such as the Hallmar model no. PA-1, which may be opened or closed depending upon the signals generated by a control unit 424 over lines 426, 428, and 430, respectively.

Switches 418, 420, and 422 are shown FIG. 7 to each have a second position B, in which position the switches connect secondaries 404, 406, and 408 to control electrode 400 through line 308. Thus, each switch 418, 420, and 422 is capable of electrically replacing or substituting a primary electrode 26, 28, and 30, respectively, with control electrode 200. Preferably, switches 418, 420, and 422 are moved sequentially from position A to position B and returned to position A at zero cross-over points of the current appearing in secondaries 404, 406, and 408. These cross-over points may be determined by cross-over point sensors 432, 434, and 436 which are electrically coupled to secondaries 404, 406, and 408, respectively.

The substitutions may last for as long as a single cycle, or for several cycles, depending upon the amount of current necessary to be diverted to control electrode 200 to maintain the desired temperature as detected by temperature sensor 320, and/or the desired rate of flow as detected by load cells 326. As additional current is required, the amount of substitution by switches 418, 420 and 422 is increased by control unit 424. When the input from load cells 326 and temperature sensor 320 indicate that less current is required, the amount of substitution by switches 418, 420, and 422 is decreased.

Additional control over the temperature adjacent orifice 16 is provided by the operation of motor 202. When additional temperature is required adjacent orifice 16, motor 202 may be operated by a signal from control unit 424 over line 324 to move surface 220 of control electrode 200 closer to orifice 16 in nozzle 18, and, in the converse, to move surface 220 farther away when less temperature is required.

Control unit 424 is also coupled by line 442 to nozzle coolant valve 24, and by line 444 to vessel coolant valves 124. As stated above, nozzle coolant valve 24 controls the flow of coolant through cooling mechanism 22 of nozzle support assembly 20. More specifically, valve 24 controls the flow of fluid through pipes 66 and 70 in FIG. 2. Vessel coolant valves 124 are illustratively shown in FIGS. 4A and 4B as governing the flow of coolant allowed into chambers 112, 114, 116, and 118 of vessel 10. As will be explained below, the operation of coolant valve 24 permits the selective freezing of product in orifice 16 to close off and terminate the flow of product through nozzle 18, and the operation of vessel coolant valves 124 help to selectively position the pool of melted product adjacent orifice.

In operation, product to be melted, preferably minerals commonly referred to as fly ash, is introduced into vessel 10 through opening 14 in sufficient quantity to cover orifice 16, primary electrodes 26, 28, and 30, and control electrode 200. To begin the melting process, control electrode 200 is moved into a position whereby lower conductive surface 220 is immediately adjacent, but not touching, upper surface 44 of nozzle 18.

Electrical energy is thereafter supplied to primary electrodes 26, 28, and 30 through secondaries 404, 406, and 408. In addition, switches 418, 420, and 422 are operated to provide time-sharing of the current supplied to primary electrodes 26, 28, and 30 with control electrode 200. The amount of time-sharing is increased until the temperature between lower surface 220 and control electrode 200 and upper surface 44 of nozzle 18 is sufficient to melt product adjacent orifice 16. As the melting process continues, nozzle control valve 24 is opened to provide coolant flow through pipes 66 and 70 of nozzle support assembly 20 sufficient to assure that the pool of melted product adjacent orifice 16 does not come in contact with nozzle support assembly 20.

As the pool adjacent orifice 16 grows, conductive surface 220 of control electrode 200 may be withdrawn through operation of motor 202 from surface 44 of nozzle 18, and the amount of time-sharing by control electrode 200 may be reduced through the operation of switches 418, 420, and 422.

When the pool of melted product finally reaches conductive surfaces 182 of primary electrodes 26, 28, and 30, the operation of control electrode 200 may be temporarily suspended, and conductive surface 220 may be moved even farther from surface 44 of nozzle 18. When the conductive pool reaches conductive surface 182 of primary electrodes 26, 28, and 30, a low current between the primary electrodes may maintain that pool in a melted state. If it is not desired to begin pouring operation, nozzle control valve 24 may be further opened to increase the cooling of nozzle support assembly 20, and thereby solidify melted product in channel 46 of nozzle 18 to plug nozzle 18 and prohibit additional flow of product from the melt pool through nozzle 18.

Thereafter, a pour operation may begin by moving control electrode 200 back toward nozzle 18, until conductive surface 220 of control electrode 200 is again immediately adjacent, but not touching, upper surface 44 of nozzle 18. The time-sharing process then commences, with time-sharing of current from secondaries 404, 406, and 408 with control electrode 200 until the intensity of current through control electrode 200 and nozzle 18 is sufficient to melt out the plug which had been formed in channel 46 of nozzle 18. Thereafter, conductive surface 220 of control electrode 200 is once again moved back from upper surface 44 of nozzle 18, but preferably remains at a position clearly closer to orifice 16 than any of primary electrodes 26, 28, or 30. For example, if channel 46 has an internal diameter of approximately two and one-half inches, conductive surface 220 is ideally positioned on the order of one-half of an inch above upper surface 44 in order to accomplish melting of product solidified in channel 46, and is thereafter preferably positioned anywhere between one and one-half to three inches above surface 44 depending upon the desired pour rate, the conductivity of the product to be melted, the amount of current supplied by secondaries 404, 406, and 408, and the amount of time-sharing provided by switches 418, 420, and 422.

Measurement by load cells 326 indicates the continuous weight of vessel and product 12. With a known fixed amount of product 12 being continuously added to vessel 10, for example 40,000 lb/hr, a rate of flow of product through orifice 16 less than 40,000 lb/hr will be evidenced by an increase in the reading of load cells 326, and a pour rate of greater than 40,000 lb/hr will be indicated by load cells 326 as a decrease in the overall weight of vessel 10 and product 12. Control circuit 300 must be set up to either increase the amount of time-sharing by control electrode 200 and/or decrease the amount of distance between conductive surface 220 of control electrode 200 and orifice 16 in the event load cells 326 indicate that the pour rate must be increased. A converse operation must occur through the operation of control circuit 300 in the event load cells 326 indicate that the pour must be decreased.

Similarly, temperature of melted product passing through orifice 16 is detected by temperature sensor 326, and used to control the operation of control circuit 300.

Furthermore, the temperature of coolant passing through compartments 112, 114, 116, and 118 of vessel 10 may be continuously detected to determine the location of the melted pool formed by electrodes 26, 28, and 30. If, for example, the temperature of coolant exiting the compartment 114 on the extreme left-hand side of vessel 10 is warmer than the coolant exiting the compartment 118 on the extreme right-hand side of vessel 10, this indicates that the pool of melted product is not directly centered over orifice 16, and instead is shifted to the left. To control the shift of the position of the pool of melted product, vessel cooling valves 426 are reset to increase the relative flow of coolant through the left-hand quadrant of vessel 10 and thereby shift the pool of melted product back into a centered position over orifice 16.

Accordingly, the present invention provides apparatus and methods for definitively controlling the temperature of product immediately adjacent a product exit orifice of the vessel, the flow rate of product passing through that orifice, and the position of a pool surrounding that orifice.

FIG. 8 shows an embodiment of the melting furnace of the subject invention incorporating a modified nozzle. More specifically, in FIG. 8 there is illustrated a nozzle 450 comprising an open-ended tubular member 452 constructed of heat resistant material. Tubular member 452 preferably comprises a simple, inexpensive, graphite open-ended cylinder. Tubular member 452, as shown in FIG. 8, has one open end mounted to the floor of vessel 10 coincident with opening 90 in the floor of vessel 10 by means of an insulation ring 454. Preferably, insulation ring 454 is constructed in the shape of an annular grommet which surrounds opening 90, and an annular recess 456 is cut into the outside circumference of the lower end of tubular member 452 so that the recess portion of 452 fits within the interior of insulation ring 454, with the remainder of tubular member 452 extending into vessel 10.

Nozzle 450, as illustrated in FIG. 8, further comprises a flat plate 458 of hardened material removably mounted on the other end of tubular member 452. Flat plate 458 is preferably constructed of molybdenum or graphite, and due to its flat nature is relatively inexpensive and easy to construct. Flat plate 458 has contained within it an opening 460 which forms the product exit orifice of vessel 10. Accordingly, melted product within vessel 10 exits through opening 460 of flat plate 458, through tubular member 452, and out opening 90 in the floor of vessel 10. Flat plate 458 preferably contains at the lower outer circumference thereof a recess 462 which is dimensioned to permit the lower portion of flat plate 458 to be slidably inserted within the upper open end of tubular member 452. Accordingly, the use of annular recesses 456 and 462 permit nozzle 450 to be easily manufactured, assembled, and removed.

An electrical connection from nozzle 450 to control 300 is illustrated in FIG. 8 by line 464, and nitrogen input cooling tubes 466 are also present to provide internal cooling for nozzle 450. However, it should be noted that since no stainless steel is employed within nozzle 450, or to support nozzle 450, no water coolant tubes are required, and as a consequence there is no risk of steam explosion due to corrosion of a water coolant tube. Accordingly, there is provided in FIG. 8 an illustration of continuous pore nozzle which is inexpensive to manufacture and easy to replace.

In accordance with another aspect of the subject invention there is provided a system for converting fly ash to mineral which includes a furnace means for melting fly ash to produce a molten stream, preferably taking the form of an electronic furnace as described above. In addition there is provided spinner means located below the furnace means to intersect the molten stream and convert the molten stream into fibrous strands and shot; means for accumulating the fibrous strands, including an input opening located adjacent the spinner means; bin means located below the spinner means to receive the shot and being open to atmospheric pressure air; airtight chamber means for enclosing therewithin the molten stream and the spinner means, the chamber means including an airtight seal to the input opening of the means for accumulating, and an adjustable access for shot to the bin means, which access also provides the only source of air to the chamber means; and air-flow means for drawing atmospheric pressure air from the bin means, through the adjustable access, past the spinner means, and into the means for accumulating to carry the fibrous strands into the means for accumulating, the adjustable access being operable to selectively limit the rate of flow of the air to thereby control the average weight of fibrous strands entering the means for accumulating.

As illustratively shown in FIG. 9, there is provided a furnace 500, preferably of the type described above, which is capable of melting fly ash introduced into a hopper 502 to produce a molten stream 504. A spinner 506 of conventional construction is located blow furnace 500. Spinner 506 contains a plurality of spinning wheels 508 as best shown in FIG. 10, positioned to intersect molten stream 504 and convert molten stream 504 into fibrous strands and shot. It is to be understood that the term "shot" as used herein as intended to include all forms of accumulated material such as balls of solidified fly ash, slugs of solidified fly ash, and interconnected fibrous strands of fly ash which are generally of a form not suitable for use as high quality insulative mineral wool. Accordingly, the terms "fibrous strands" and "shot" as used herein are collectively intended to identify all forms of product resulting from the operation of wheels 508 upon molten stream 504.

As further illustrated in FIG. 9 there is provided an accumulator 510 of any conventional construction which collects fibrous strands from spinner 506. For example, accumulator 510 in FIG. 9 is illustrated as comprising a collector of fibrous strands including a continuous, moveable, porous belt 512. Accumulator 510 also includes at least one input opening 514 located adjacent spinner 506.

As further illustrated in FIG. 9 there is provided a bin 516 located below spinner 506 to receive shot produced by spinner 506. Bin 516 is open to the atmosphere to receive atmospheric pressure air, except for where bin 516 is covered by an air tight chamber 518.

Air tight chamber 518, as disclosed in FIG. 9, encloses therewithin molten stream 504 and at least spinning wheels 508 of spinner 506. Chamber 518 includes an air tight seal to opening 514 in the form of sharing a common wall 520 with accumulator 510 in which opening 514 is formed. The seal may also comprise mere union with the top of accumulator 510, in the event opening 514 is not defined in part by wall 520. In such a case, chamber 518 is merely an extension of accumulator 510. Chamber 518 may also include a shot deflection wall 521 which provides an area free from shot between wall 521 and furnace 500 in which temperature and/or weight sensors may be located. Air tight chamber 518 further contains therewithin an adjustable access 522 for input of shot to bin 516, which adjustable access 522 also provides the only source of air into chamber 518.

Spinner 506 is provided access to the interior of airtight chamber 518 through opening 540. As is best illustrated in FIGS. 10 and 11, the shape of opening 540 is designed to be coincident with the outside shape of the housing 506. Moreover, opening 540 is preferably lined with a seal 542 to enhance the airtight connection between chamber 518 and spinner 506. Furthermore, as shown in FIG. 10, spinner 506 preferably is mounted on a plurality of wheels 544 to facilitate selective removal of spinner 506 from opening 540 of chamber 518.

The system illustrated in FIG. 9 further includes a fan or blower 524 attached to accumulator 510 for drawing air out of bin 516, through adjustable access 522, past spinning wheels 508 of spinner 506, and into accumulator 510 for carrying fibrous strands into accumulator 510. The input to blower or fan 524 is located below fibrous belt 512, and, accordingly, acts to accumulate fiber upon the upper surface of belt 512.

As shown in FIG. 9 adjustable access 522 preferably comprises an inverted V-shaped plate 526 hinged at the apex 528 of the V and located with one leg 530 of the V guiding fibrous strands to belt 512 and the other leg 532 of plate 526 guiding shot to bin 516. Plate 526 is adjustably moveable by means of a hydraulic mechanism 534. A second plate 536 is hinge-mounted opposite plate 532. The position of plate 536 is governed through operation of hydraulic mechanism 538. As mentioned above, bin 516 is open to atmospheric pressure air. For example, bin 516 may extend beyond chamber 518 as best shown in FIG. 13.

In the operation of the system illustrated in FIG. 9, molten stream 504 is converted into fibrous strands and shot by operation of spinner 506. Fan or blower 524 operates to generate a current flow illustrated by arrows 540, drawing air from bin 516, through adjustable access 522, past wheels 508 of spinner 506, through opening 514 and into the interior of accumulator 510. It is important to note that since wheels 508 are located directly in the flow of air illustrated by arrows 540, separation of shot from fibrous strands occurs essentially simultaneously with the formation of the shot and strands. Moreover, it should be noted that operation of adjustable access 526 selectively limits the rate of flow of air illustrated by arrows 540 to thereby control the average weight of fibrous strands entering into accumulator 510. If light and heavy strands are desired to be accumulated, access 522 is opened wide to permit a heavy airflow, whereas if only the lightest of strands is desired to be accumulated, adjustable access 522 is operated to reduce the space between the plates 532 and 536 and thereby reduce the airflow illustrated by arrows 540.

Accumulator 510 does not necessarily need to comprise a simple collector. Instead, accumulator 510 may include both a collector for forming fibrous strands into a blanket of mineral wool and a cyclone for separating heavy fibrous strands and shot from lighter fibrous strands. For example, as shown in FIGS. 12 and 13, a multistage collector 600 and a cyclone 602 are interconnected by conduits 604 and 606. As is best illustrated in FIGS. 12 and 13 the fibrous output of a spinner 608, located to intersect a molten stream from a furnace 610, is coupled by conduit 606 to the input of cyclone 602.

The light fiber, vortex output 607 of cyclone 602 is, in turn, coupled by conduit 604 to an input opening 609 of multistage collector 600. Accordingly, fibrous strands output from spinner 608 first pass through cyclone 602 where shot and heavy fibrous strands not deposited in bin 516 are separated from lighter fibrous strands, and only the lighter fibrous strands are delivered back to collector 600 for formation of a high quality mineral wool blanket.

Preferably, collector 600 is of a multistage variety including three separate compartments 612, 614 and 616. The light fibrous strands from output 607 of cyclone 602 are inputted by conduit 604 to first compartment 612. A blower 618 draws air from conduit 604 through compartment 612 and that portion of a porous, moveable belt 620 located within compartment 612. The air removed from compartment 612 by blower 618 is introduced into compartment 614 by conduit 622. In turn, the air and fibrous particles introduced into compartment 614 by blower 618 are drawn through that portion of belt 620 located in compartment 614 by fan or blower 624 and delivered to compartment 616 by conduit 626. Air and fibers are withdrawn from compartment 616 by operation of fan or blower 628 which draws air and the smallest of fibrous strands through that portion of belt 620 located within compartment 616 and removes the resultant air and fiber strand particles from collector 600 through conduit 630.

In accordance with another aspect of the present invention, a conduit means is provided which preferably includes means for selectively using the lighter fibrous strands output of the cyclone as the output of the system. Moreover, the conduit means preferably also includes means for selectively bypassing the cyclone means altogether by directly connecting the output of the spinner to the input of the collector means.

As illustratively shown in FIGS. 12 and 13, conduit 604 preferably includes a gate valve 632 which is operable in a first position to provide continuity between the light fiber, vortex output 607 of cyclone 602 and the input of conduit 604, and gate valve 632 is operable in a second position to terminate access from cyclone 602 to conduit 604, and instead connect the light fiber, vortex output 607 of cyclone 602 to an output conduit 634. Accordingly, the system of FIGS. 12 and 13 provides, through operation of control gate 632, the capacity to selectively provide as output the light fibers separated in cyclone 602 from heavier fibers and shot.

Figure 15:
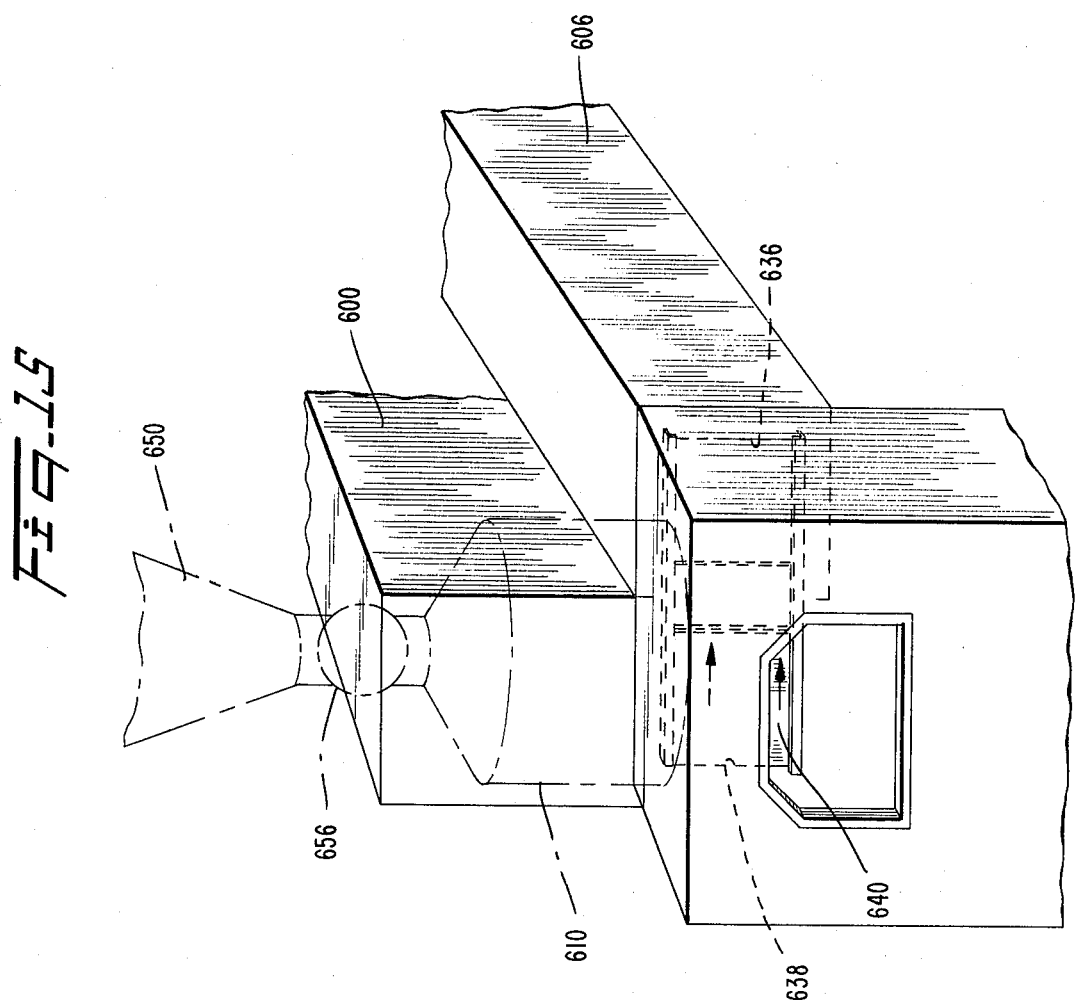
FIG. 15 is a perspective view of the openings illustrated in FIG. 14.

The system illustrated in FIGS. 12 and 13 also has the capacity to selectively bypass cyclone 602 and instead feed the fibrous strand output from spinner 608 directly into multistage collector 600. As shown in FIGS. 14 and 15, spinner 608 is positioned adjacent not only an opening 636 to conduit 606 but also adjacent an opening 638 to multistage collector 600. A sliding door 640 is moveable between openings 636 and 638 to selectively provide access to either cyclone 602 through conduit 606 or to collector 600 through opening 638. When the system of FIGS. 12-15 is operated to bypass cyclone 602, it is preferable that a gate valve 642 in conduit 604 adjacent opening 609 to collector 600 be positioned to close off conduit 604.

The system of FIGS. 12-15 accordingly provides for a high degree of production of mineral wool. The system can be used as a collector of both mineral wool which includes heavy fibers and extraneous shot by closing off gate 632 and using only a lower heavy material output 633 of cyclone 602. The system can be used to provide blankets of very fine high quality mineral wool by first filtering the fibrous strand output of spinner 608 through cyclone 602 before collecting the lightest of these strands in multistage collector 600. The system can also be used to manufacture a coarser quality of mineral wool through operation of sliding door 640 which effectively bypasses cyclone 602.

The present invention provides for even greater flexibility of mineral wool production through the utilization of a cyclone means coupled to the output of a spinner means which cyclone means includes a conically-shaped chamber having a vertically aligned longitudinal axis and having a decreasing diameter from top to bottom, means for introducing output from the spinner means at the top of the chamber, means for removing heavy fibrous strands and shot from the bottom of the chamber, and vortex tube means for removing lighter fibrous strands from the chamber, the vortex tube means including a first tubular member have a longitudinal axis coincident with the axis of the chamber and with the lower end of the first tubular means extending into the interior of the chamber, and means for adjusting the distance the first tubular member extends into the chamber to thereby control the average weight of the lighter fibrous strands removed from the chamber through the vortex tube means.

Figure 16:
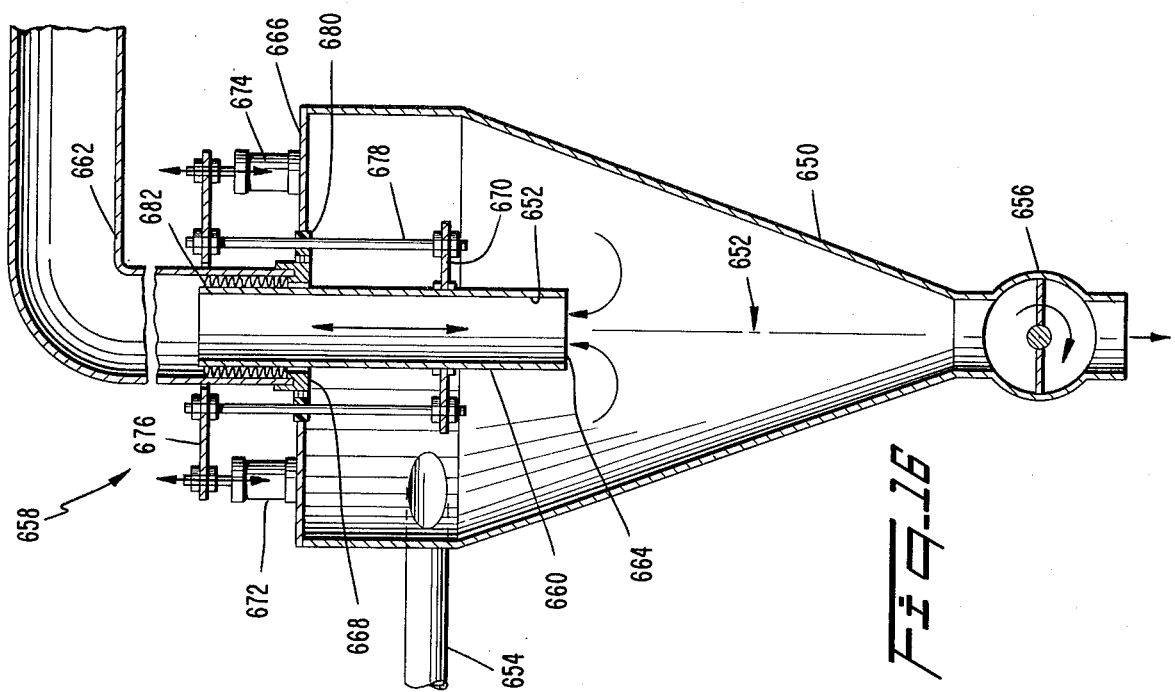
FIG. 16 is a sectioned side view of a cyclone used to convert fly ash to mineral wool in accordance with the teachings of the present invention.

One illustrative embodiment of the preferred cyclone of the present invention is shown in FIG. 16 to include a conically-shaped chamber 650 having a vertically aligned longitudinal axis 652 and having a decreasing diameter from top to bottom. A conduit 654 is attached to the upper outside circumference of chamber 650 to introduce output from a spinner to the top of chamber 650. A rotary valve 656 is provided at the bottom of chamber 650 to permit removal of heavy fibrous strands and shot from chamber 650. A vortex tube assembly 658 is shown comprising a first tubular member 660 and a second tubular member 662. First tubular member 660 has a longitudinal axis coincident with axis 652 of chamber 650. First tubular member 660 has an open lower end 664 which extends into the interior of chamber 650. Second tubular member 662 is rigidly mounted to the top 666 of chamber 650 by brackets 668. First tubular member 660, however, is slidably mounted to top 666 of chamber 650, with the uppermost portion of first tubular member 660 slidably located within the lowermost portion of second tubular member 662.

As illustrative shown in FIG. 16, the slidably mounting of first tubular member 660 to top 666 of chamber 650 may be accomplished by means of a bracket 670 attached to the outside of that portion of first tubular member 660 which extends into the interior of chamber 650. Hydraulic mechanisms 672 and 674 are shown mounted on top 666 of chamber 650. A support plate 676 coupled to hydraulic mechanisms 672 and 674 and surrounding second member 662 is made to move up and down selectively through the operation of hydraulic mechanisms 672 and 674. Support plate 676 is connected to bracket 670 by rigid bars 678 which pass through top 666 by means of teflon seals 680. Finally, a packing seal 682 is provided between the external surface of first tubular member 660 and the internal surface of second tubular member 662.

In operation, when light and heavy fibrous strands as desired to be collected by the operation of the cyclone shown in FIG. 16, first tubular member 660 is lowered into the interior of chamber 650. However, when only lighter fibrous strands are desired to be collected, first tubular 660 is raised by operation of hydraulic mechanisms 672 and 674, to thereby allow only lighter fibrous materials to enter first tubular member 660 through lower end 664.

The electronic furnace, adjustable cyclone, and interconnecting conduit assembly of the present invention provide an extremely flexible mechanism for converting fly ash into mineral wool. The high tolerance temperature adjustment of the electronic furnace coupled with the refined fibrous strands selection provided by the teachings of the present invention are believed to result in the production of an entirely new form of mineral wool, namely mineral wool which contains a high percentage by weight of fibrous strands having a highly desirable diameter from an insulative standpoint. Specifically, it is believed that through operation of the apparatus and methods disclosed herein an accumulated mineral wool product can be manufactured consisting at least 80% by weight of strands which have a diameter of greater than about 5 microns and less than about 7 microns. It is further believed that a mineral wool product consisting of at least 80% by weight of strands having a diameter of at least 5 microns and less than about 10 microns can also be produced. Moreover, it is believed that mineral wool produced by fly ash using the teachings of the present invention can consist of 80% by weight of strands having a diameter greater than 5 microns and less than 15 microns. Other ranges which are believed capable of being produced by the apparatus and methods of the subject invention include at least 80% by weight of strands having a diameter greater than 3 microns and less than 7 microns, greater than 3 microns and less than 10 microns, greater than 3 microns and less than 15 microns, and at least 70% by weight of strands having a diameter greater than 3 microns and less than 15 microns, at least 70% by weight of strands having a diameter greater than 5 microns and less than 7 microns, at least 70% by weight of strands having a diameter greater than 5 microns and less than 10 microns, at least 70% by weight of strands having a diameter greater than 5 microns and less than 15 microns, at least 70% by weight strands having a diameter greater than about 3 microns and less than about 10 microns, and at least 70% by weight of strands having a diameter greater than about 3 microns and less than about 15 microns.

In short, it is believed that through the teachings of the present invention, a high quality mineral wool product can be produced which substantially exceeds the insulative qualities of any mineral wool heretofore manufactured. Moreover, through the teachings of the present invention extremely high volumes of this mineral wool can be manufactured using fly ash which heretofore had been considered an economic liability and environmental waste product hazard.

Additional advantage and modifications of the subject invention will readily occur to those skilled in the art. The invention in its broader aspects is, therefore, not limited to the specific details, representative apparatus, and methods and illustrative examples shown and described. Accordingly, departures may be made from such details without departing from the spirit or scope of applicant's general inventive concept.

I claim:

1. A system for converting fly ash to mineral wool comprising:
   a. furnace means for melting fly ash to produce a molten stream;

b. spinner means located below said furnace means to intersect said molten stream and convert said molten stream into fibrous strands and shot;

c. means for accumulating said fibrous strands including an input opening located adjacent said spinner means;

d. bin means located below said spinner means to receive said shot, said bin means being open to atmospheric pressure air;

e. air-tight chamber means for enclosing therewithin the molten stream and said spinner means, said chamber means including an air-tight seal to said input opening of said means for accumulating, and an adjustable access for said shot to said bin means, which access also provides the only source of air to said chamber means; and f. air-flow means for drawing atmospheric pressure air from said bin means, through said adjustable access, past said spinner means and into said means for accumulating to carry said fibrous strands into said means for accumulating, said adjustable access being operable to selectively limit the rate of flow of said air to thereby control the average weight of said fibrous strands entering said means for accumulating.

2. The system of claim 1 wherein said adjustable access to said bin means includes at least one hinged plate.

3. The system of claim 1 wherein said means for accumulating includes collector means for forming fibrous strands into a blanket of mineral wool, which collector means includes a continuous, moveable, porous belt located adjacent said input opening; and said adjustable access to said bin means includes an inverted V-shaped plate hinged at the apex of said V and located with one leg of said V-shaped plate guiding said fibrous strands to said belt and the other leg of said plate guiding said shot to said bin means.

4. The system of claim 3 wherein said adjustable access includes a second hinged plate.

5. The system of claim 1 wherein said adjustable access is hydraulically controlled.

6. The system of claim 1 wherein said spinner means is removeable from said chamber means.

7. The system of claim 1 wherein said furnace means comprises:

a. a vessel for receiving said fly ash, said vessel having means for defining a product exit orifice;

b. a plurality of primary electrode means for defining primary current paths adjacent said orifice;

c. control electrode means for defining a current path to said means for defining; and d. circuit means for energizing said primary means with multiphased current and for time-sharing said multiphased current with said control electrode means.

8. The system of claim 1 wherein said means for accumulating comprises:

a. collector means for forming fibrous strands into a blanket of mineral wool;

b. cyclone means capable of separating heavy particles of fibrous strands and shot from lighter fibrous strands; and c. conduit means for delivering said fibrous strands from said spinner means to said cyclone means and for delivering said lighter fibrous strands outputted from said cyclone means to said collector means.

9. A system for converting fly ash to a mineral wool comprising:

a. furnace means for melting fly ash to produce a molten stream;

b. spinner means for converting said molten stream into an output of fibrous strands and shot;

c. cyclone means capable of separating heavy fibrous strands and shot from lighter fibrous strands;

d. collector means for forming fibrous strands into a blanket of mineral wool; and e. conduit means for delivering fibrous strands from said spinner means to said cyclone means and for delivering said lighter fibrous strands independent of said heavy fibrous strands and shot from said cyclone means to said collector means.

10. The system of claim 9 wherein said conduit means includes means for selectively using the lighter fibrous strand output of said cyclone as the output of said system.

11. The system of claim 9 wherein said conduit means includes means for selectively bypassing said cyclone means by directly connecting the output of said spinner means to the input of said collector means.

12. The system of claim 9 wherein said cyclone means includes a conically shaped chamber having a vertically aligned longitudinal axis and having a decreasing diameter from top to bottom, means for introducing input from said spinner means at the top of said chamber, means for removing said heavy fibrous strands and shot from the bottom of said chamber, and vortex tube means for removing said lighter fibrous strands from said chamber, said vortex tube means including a first tubular member having a longitudinal axis coincident with said axis of said chamber and with the lower end of said first tubular means extending into the interior of said chamber, and means for adjusting the distance said first tubular member extends into said chamber to thereby control the average weight of said lighter fibrous strands removed from said chamber through said vortex tube means.

13. The system of claim 12 wherein said vortex tube means includes a second tubular member fixedly mounted to the top of said chamber to extend beyond the top of said chamber and said first tubular member is slidably mounted to the top of said chamber, with the uppermost portion of said first tubular member slidably located within the lowermost portion of said second tubular member.

14. A system for converting fly ash to mineral wool comprising:

a. furnace means for melting fly ash to produce a molten stream;

b. spinner means for converting said molten stream into an output of fibrous strands and shot;

c. cyclone means coupled to the output of said spinner means capable of separating heavy fibrous strands and shot from lighter fibrous strands, said cyclone means including a conically-shaped chamber having a vertically aligned longitudinal axis and having a decreasing diameter from top to bottom, means for introducing output from said spinner means at the top of said chamber, means for removing said heavy fibrous strands and shot from the bottom of said chamber, and vortex tube means for removing said lighter fibrous strands from said chamber, said vortex tubular means including a first tubular member having a longitudinal axis coincident with said axis of said chamber and with the lower end of the first tubular means extending into the interior of said chamber, and means for adjusting the distance said first tubular member extends into said chamber to thereby control the average weight of said lighter fibrous strands removed from said chamber through said vortex tube means.

15. The system of claim 14 wherein said means for adjusting comprises means for slidably mounting said first tubular member to the top of said chamber.

16. The system of claim 14 wherein said vortex tube means includes a second tubular member fixedly mounted to the top of said chamber and said first tubular member is slidably mounted to the top of said chamber, with the uppermost portion of said first tubular member slidably located within the lowermost portion of said second tubular member.

* * * * *